(12) United States Patent
De Santos

(10) Patent No.: US 11,691,741 B2
(45) Date of Patent: Jul. 4, 2023

(54) SYSTEM AND METHOD FOR A CONNECTOR ASSEMBLY IN AN AIRCRAFT

(71) Applicant: The Boeing Company, Chicago, IL (US)

(72) Inventor: Luis A. De Santos, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 500 days.

(21) Appl. No.: 16/864,044

(22) Filed: Apr. 30, 2020

(65) Prior Publication Data

US 2021/0339873 A1 Nov. 4, 2021

(51) Int. Cl.
| | |
|---|---|
| *F16L 55/027* | (2006.01) |
| *B64D 13/06* | (2006.01) |
| *B64D 13/00* | (2006.01) |
| *F16L 37/00* | (2006.01) |
| *F16L 37/05* | (2006.01) |
| *F16L 37/08* | (2006.01) |

(Continued)

(52) U.S. Cl.
CPC .............. *B64D 13/06* (2013.01); *B64D 13/00* (2013.01); *F16L 55/02718* (2013.01); *B64D 2013/003* (2013.01); *F15D 1/025* (2013.01); *F16L 37/00* (2013.01); *F16L 37/05* (2013.01); *F16L 37/08* (2013.01); *F24F 13/0209* (2013.01); *Y10T 137/9029* (2015.04)

(58) Field of Classification Search
CPC ..... F16L 55/124; F16L 55/105; F16L 55/027; F16L 55/02718; F16L 55/02709; Y10T 137/9029
USPC ............................................. 138/44, 94, 94.3
See application file for complete search history.

(56) References Cited

U.S. PATENT DOCUMENTS

| | | | |
|---|---|---|---|
| 2,585,290 A | 2/1952 | Walker | |
| 4,422,339 A * | 12/1983 | Gall | ........................ G01F 1/42 |
| | | | 29/445 |
| 4,792,363 A | 12/1988 | Franklin, Jr. et al. | |

(Continued)

FOREIGN PATENT DOCUMENTS

| | | |
|---|---|---|
| CN | 110235748 A | 9/2019 |
| KR | 20120054788 A | 5/2012 |
| WO | 2017005862 A1 | 1/2017 |

OTHER PUBLICATIONS

Extended European Search Report regarding European Patent Application No. 21167872.7 dated Aug. 24, 2021, pp. 1-7.

*Primary Examiner* — Patrick F Brinson
(74) *Attorney, Agent, or Firm* — Armstrong Teasdale LLP

(57) ABSTRACT

An environmental control system for an aircraft includes a first conduit, a second conduit, and a connector assembly. The connector assembly is coupled to the first conduit and the second conduit for controlling a flow of air. The connector assembly includes a connector, a connector ring, and an orifice plate. The connector includes at least one wall including a ridge defining a receptacle and a connector slot defined within the ridge. The connector ring is attached to the connector and defines a connector ring slot and a covering portion. The connector ring slot aligns with the connector slot and the orifice plate is inserted into through the connector ring slot and the connector slot into the receptacle during installation of the orifice plate. The covering portion covers the connector slot and retains the orifice plate within the receptacle during operation of the environmental control system.

20 Claims, 14 Drawing Sheets

(51) Int. Cl.
*F15D 1/02* (2006.01)
*F24F 13/02* (2006.01)

(56) References Cited

U.S. PATENT DOCUMENTS

| | | | | |
|---|---|---|---|---|
| 5,421,274 | A * | 6/1995 | Gordon | F23K 3/02 |
| | | | | 138/40 |
| 7,051,765 | B1 | 5/2006 | Kelley et al. | |
| 7,325,442 | B1 * | 2/2008 | Pampinella | G01M 3/04 |
| | | | | 251/319 |
| 7,845,688 | B2 * | 12/2010 | Gallagher | F16L 39/00 |
| | | | | 138/44 |
| 9,926,759 | B2 * | 3/2018 | Colby | G01F 1/42 |
| 9,996,087 | B2 | 6/2018 | Vandyke | |
| 2003/0056843 | A1 * | 3/2003 | Carey | F16L 23/003 |
| | | | | 138/94 |
| 2006/0231149 | A1 * | 10/2006 | Kulkarni | G01F 1/42 |
| | | | | 138/44 |
| 2008/0018103 | A1 | 1/2008 | Laib | |
| 2017/0307125 | A1 * | 10/2017 | Shinners | F16L 55/02718 |

\* cited by examiner

900

902
Inserting the Orifice Plate Through the Connector Slot and the Connector Ring Slot into the Receptacle 904
Aligning the Covering Portion with the Connector Slot

1102
Aligning the Connector Slot with the Ring Slot

1104
Removing the First Orifice Plate Through the Connector Slot with the Connector Ring Slot

1106
Inserting a Second Orifice Plate Through the Connector Slot and the Connector Ring Slot into the Receptacle

1108
Aligning the Covering Portion with the Connector Slot

FIG. 12

SYSTEM AND METHOD FOR A CONNECTOR ASSEMBLY IN AN AIRCRAFT

FIELD

The field of the disclosure relates generally to fluid control devices and, more specifically, to a system and method for a connector assembly with a removable orifice plate for an environmental control system of an aircraft.

BACKGROUND

Some aircraft include environmental control systems to channel or duct fluid, typically air, to various locations (e.g., cabin, lavatories, galleys) within the aircraft. For example, the environmental control system may vent air away from lavatories to remove or reduce odor within the lavatories. The environmental control system typically includes conduits (such as ducts and flex hoses) that channel the air, and flow control devices to control the flow of air within the environmental control system. Because of tight spaces within the aircraft, at least some of the flow control devices include orifice plates. Orifice plates are typically small, low weight plates with orifices extending through the plate that control the flow of the fluid through the orifice. The small size of the orifice plate allows it to control flow in the tight spaces and close confines within the aircraft. However, because the size and shape of the orifice is fixed, orifice plates cannot adapt to changing flow rates and must be manually exchanged in order to change how the plate controls the flow or to perform maintenance on the environmental control system.

Orifice plates are typically installed in ducts of environmental control systems by attaching the orifice plate to an end of the duct with an adhesive. Additionally, the orifice plates typically have identification tags attached to an edge of the orifice plate that are also attached to the duct. The installation process requires that the adhesive sets for a period of time before the environmental control system is used. Additionally, the orifice plate is typically removed from the duct by heating the duct and the orifice plate to strain or beak the adhesive, allowing the orifice plate to be removed without damaging the duct or the plate. Accordingly, removing and installing orifice plates within environmental control systems of aircraft is typically a time consuming and cumbersome process.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

One aspect is directed to an environmental control system for an aircraft including a first conduit for channeling air, a second conduit for channeling the air, and a connector assembly. The connector assembly is coupled to the first conduit and the second conduit for controlling a flow of air from the first conduit to the second conduit. The connector assembly includes a connector, a connector ring, and an orifice plate. The connector includes at least one wall including a ridge defining a receptacle and a connector slot defined within the ridge. The connector ring is attached to the connector and defines a connector ring slot and a covering portion. The connector ring slot aligns with the connector slot and the orifice plate is inserted into through the connector ring slot and the connector slot into the receptacle during installation of the orifice plate. The covering portion covers the connector slot and retains the orifice plate within the receptacle during operation of the environmental control system.

Another aspect is directed to a connector assembly for an environmental control system for an aircraft including a connector, a connector ring, and an orifice plate. The connector includes at least one wall including a ridge defining a receptacle and a connector slot defined within the ridge. The connector ring is attached to the connector and defines a connector ring slot and a covering portion. The connector ring slot aligns with the connector slot and the orifice plate is inserted into through the connector ring slot and the connector slot into the receptacle during installation of the orifice plate. The covering portion covers the connector slot and retains the orifice within the receptacle during operation of the environmental control system.

Yet another aspect is directed to a method of controlling a flow of a fluid in an environmental control system of an aircraft. The method includes installing a first conduit and a second conduit in the aircraft. The method also includes connecting a connector to the first conduit and the second conduit. The connector includes at least one wall including a ridge defining a receptacle and a connector slot defined within the ridge. The method further includes installing a connector ring on the connector. The connector ring defines a connector ring slot and a covering portion and is aligned with the connector slot. The method also includes inserting an orifice plate through the connector ring slot and the connector slot into the receptacle. The method further includes aligning the covering portion with the connector slot to cover the connector slot with the cover portion and retaining the orifice plate within the receptacle. The method also includes channeling the flow of fluid from the first conduit through the connector and the orifice plate into the second conduit. The orifice plate controls a flow rate of the flow of fluid through the connector.

Still another aspect is directed to a method of retrofitting an environmental control system of an aircraft. The method includes inserting the orifice plate through the connector slot and the connector ring slot into the receptacle. The method also includes aligning the covering portion with the connector slot.

Another aspect is directed to a method of cleaning an environmental control system of an aircraft. The method includes aligning the connector slot with the connector ring slot. The method also includes removing the orifice plate through the connector slot with the connector ring slot. The method further includes cleaning the environmental control system. The method also includes inserting the orifice plate through the connector slot and the connector ring slot into the receptacle. The method further includes aligning the covering portion with the connector slot.

Yet another aspect of the present disclosure includes a method of replacing a first orifice plate in an environmental control system of an aircraft. The method includes aligning the connector slot with the connector ring slot. The method also includes removing the first orifice plate through the connector slot with the connector ring slot. The method further includes inserting a second orifice plate through the connector slot and the connector ring slot into the receptacle. The method also includes aligning the covering portion with the connector slot.

Yet another aspect of the present disclosure includes a method of maintaining an environmental control system of an aircraft. The method includes aligning the connector slot with the connector ring slot. The method also includes removing the orifice plate through the connector slot with the connector ring slot. The method further includes performing a maintenance task on the environmental control system. The method also includes inserting the orifice plate through the connector slot and the connector ring slot into the receptacle. The method further includes aligning the covering portion with the connector slot.

Yet another aspect of the present disclosure includes a method of balancing a flow of a fluid in an environmental control system of an aircraft. The method includes calculating a current flow rate of the fluid through at least one of the first conduit and the second conduit. The method also includes calculating a balanced flow rate of the fluid through at least one of the first conduit and the second conduit different than the current flow rate. The method further includes selecting a second orifice plate based on the balanced flow rate of the fluid. The method also includes aligning the connector slot with the connector ring slot. The method further includes removing the first orifice plate through the connector slot with the connector ring slot. The method also includes inserting the second orifice plate through the connector slot and the connector ring slot into the receptacle. The method further includes aligning the covering portion with the connector slot.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF THE DRAWINGS

FIG. 10 is a flow diagram of an example of a method of retrofitting an environmental control system of the vehicle shown in FIG. 1.

FIG. 12 is a flow diagram of an example of a method of replacing a first orifice plate in an environmental control system of the vehicle shown in FIG. 1.

Figure 1:
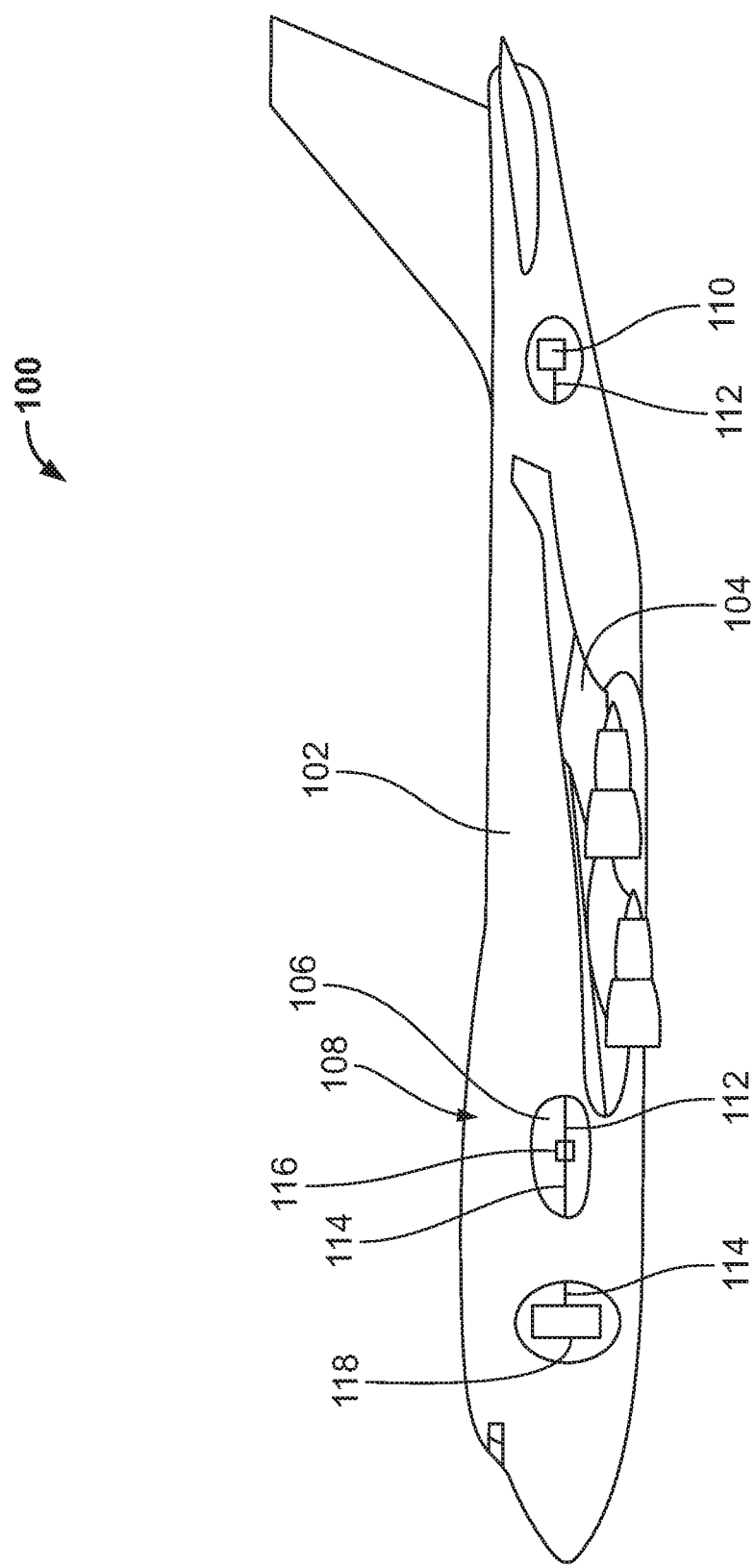
FIG. 1 is a side view of an example vehicle.

Although specific features of various examples may be shown in some drawings and not in others, this is for convenience only. Any feature of any drawing may be referenced and/or claimed in combination with any feature of any other drawing.

Unless otherwise indicated, the drawings are meant to illustrate features of examples of the disclosure. These features are believed to be applicable in a variety of systems comprising one or more examples of the disclosure. As such, the drawings are not meant to include all conventional features known by those of ordinary skill in the art to be required for the practice of the disclosed examples disclosed.

DETAILED DESCRIPTION

Examples of the systems and methods described herein include a connector assembly including a connector, a connector ring, and an orifice plate. The connector is attached to a first conduit and a second conduit of an environmental control system of an aircraft and channels a flow of fluid, typically air, from the first conduit to the second conduit. The environmental control system channels the flow of air from a source, such as a compressor, to a destination such as a lavatory, galley, or other part of the aircraft. The connector assembly enables the maintenance personnel to easily and quickly remove, replace, and install the orifice plate within the connector assembly to control the flow of air through the environmental control system. The connector has a connector slot that receives the orifice plate within a receptacle within the connector. When positioned within the receptacle, the orifice plate controls the flow of air through the first conduit, the second conduit, and the environmental control system. The connector ring is attached to the connector and includes a ring slot that substantially corresponds to the connector slot. The ring slot also includes a covering portion that covers the connector slot and retains the orifice plate within the receptacle.

During installation of the orifice plate, the connector ring is actuated (i.e., rotated the connector ring about the connector) such that the connector slot and the ring slot are substantially aligned. The orifice plate is inserted through the connector slot and the ring slot into the receptacle. The connector ring is actuated in the opposite direction (i.e., rotated the connector ring about the connector in the opposite direction) such that the connector slot and the covering portion are substantially aligned and the orifice plate is retained within the receptacle. The orifice plate controls the flow of air within the environmental control system.

During removal and/or replacement of the orifice plate, the connector ring is actuated (i.e., rotated the connector ring about the connector) such that the connector slot and the ring slot are substantially aligned. The orifice plate is inserted through the connector slot and the ring slot. A second orifice plate is inserted through the connector slot and the ring slot into the receptacle. The connector ring is actuated in the opposite direction (i.e., rotated the connector ring about the connector in the opposite direction) such that the connector slot and the covering portion are substantially aligned and the orifice plate is retained within the receptacle. The orifice plate controls the flow of air within the environmental control system.

The connector assemblies enable maintenance personnel to easily and quickly remove the orifice plate from the environmental control system. As such, the connector assemblies reduce the time, manpower, and cost of installation, replacement, and removal of the orifice plate. Once the orifice plate has been removed, maintenance personnel may clean, maintain, and/or retrofit the environmental control system. Accordingly, the connector assemblies reduce the time, manpower, and cost of cleaning, maintaining, and/or retrofitting the environmental control system.

FIG. 1 is a side view of an aircraft 100 that includes a fuselage 102 and a wing structure 104 extending from the fuselage 102. The fuselage 102 and/or the wing structure 104 define an interior volume 106 and an environmental control system 108 positioned within the interior volume 106. Specifically, the environmental control system 108 is configured to channel at least one fluid through the interior volume 106 to different parts of the vehicle 100. More specifically, the environmental control system 108 includes a source 110 of the fluid, a first conduit 112, a second conduit 114, a connector assembly 116, and a destination 118.

The source 110 includes a compressor, a pump, and/or any other fluid motive device. The destination 118 includes a lavatory, a galley, and/or any other portion of the vehicle 100. The first conduit 112, the second conduit 114, and the connector assembly 116 channel a flow of the fluid between the source 110 and the destination 118. In some embodiments, the first conduit 112, the second conduit 114, and the connector assembly 116 channel the fluid from the source 110 to the destination 118. For example, the first conduit 112, the second conduit 114, and the connector assembly 116 may channel a flow of air from the source 110 (a compressor) to the destination 118 (a galley). In an alternative embodiment, the first conduit 112, the second conduit 114, and the connector assembly 116 channel the fluid from the destination 118 to the source 110 and the source may dispose of the air to the outside environment. For example, the first conduit 112, the second conduit 114, and the connector assembly 116 may channel a flow of air from the destination 118 (a lavatory) to the source 110 (a compressor) to reduce odors in the lavatory.

Figure 2:
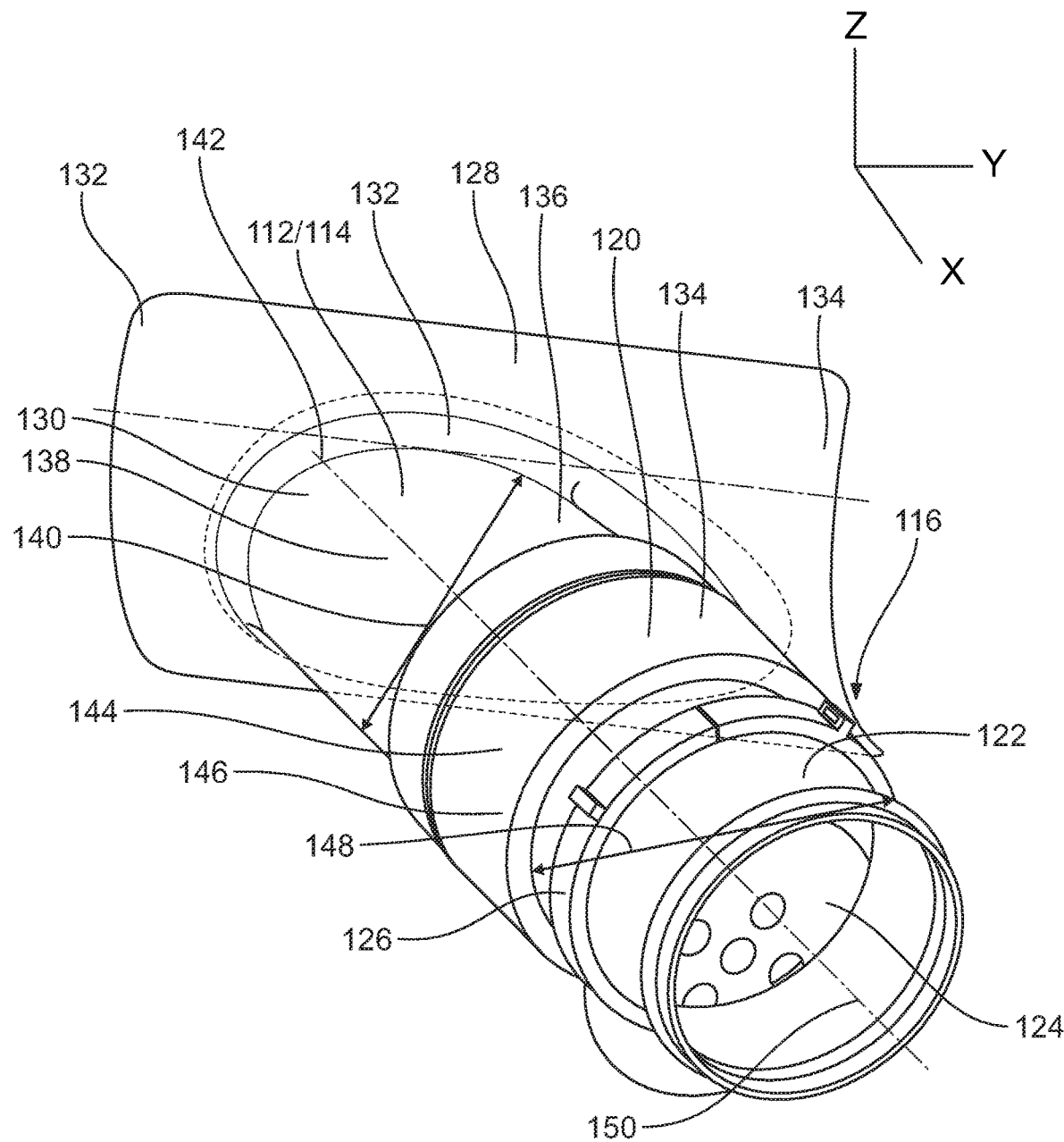
FIG. 2 is a perspective view of an example connector assembly for use in the vehicle shown in FIG. 1.
Figure 3:
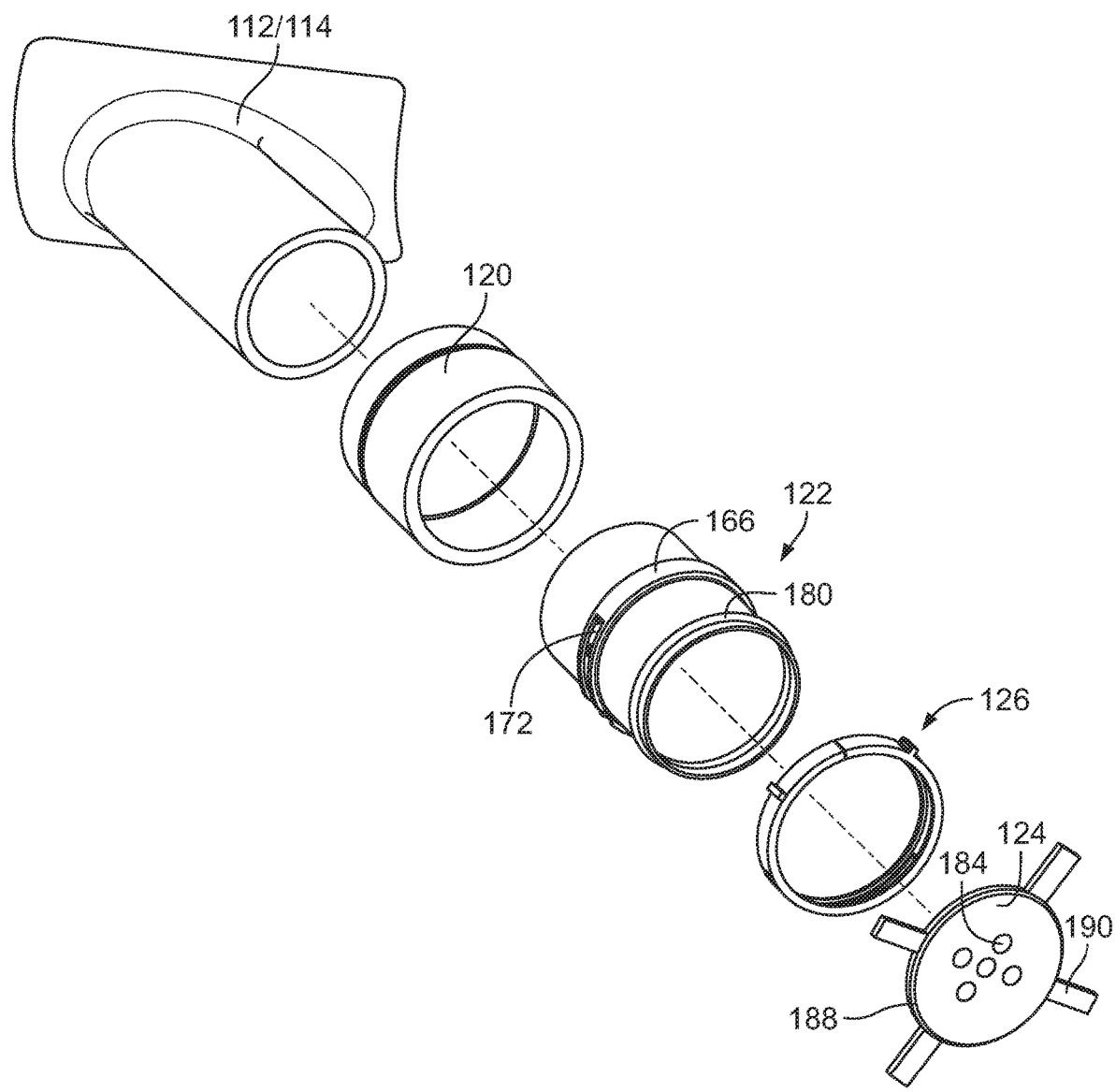
FIG. 3 is an exploded view of an example connector assembly for use in the vehicle shown in FIG. 1.

FIG. 2 is a perspective view of the connector assembly 116 attached to the first conduit 112. FIG. 3 is an exploded view of the connector assembly 116 for the environmental control system 108. The connector assemblies 116 described herein may be part of the environmental control system 108 or may be replacement kits for existing environmental control systems 108. As discussed above, the environmental control system 108 includes the first conduit 112, the second conduit 114, and the connector assembly 116. The environmental control system 108 also includes a sleeve 120 for insulating and preventing leaks from the connector assembly 116 and/or the first and second conduits 112, 114. The connector assembly 116 includes a connector 122, an orifice plate 124, and a connector ring 126. As shown in FIG. 3, the connector 122 is attached to the first and/or second conduits 112, 114 and channels the fluid from the first conduit 112 to the second conduit 114. The sleeve 120 circumscribes at least a portion of the first and/or second conduits 112, 114 and at least a portion of the connector 122 to insulate and prevent leaks from the connector 122 and the first and/or second conduits 112, 114.

As shown in FIG. 3, the first conduit 112 and the second conduit 114 are cylindrical conduits that channel the fluid from the source 110 (shown in FIG. 1) to the destination 118 (shown in FIG. 1). In alternative implementations, the first conduit 112 and the second conduit 114 may have any shape that enables the environmental control system 108 (shown in FIG. 1) to operate as described herein. In the example implementation, the environmental control system 108 is configured to channel ventilation air to a lavatory, a galley, and/or any other portion of the vehicle 100. In alternative implementations, the environmental control system 108 is configured to channel any fluid that enables the vehicle 100 to operate as described herein, and the first conduit 112 and the second conduit 114 have any shape that enables the vehicle 100 to operate as described herein. Specifically, the first conduit 112 and the second conduit 114 may include ducts, hoses, pipes, a flex hose, and/or any other type of conduit. More specifically, the first conduit 112 illustrated in FIG. 3 includes a spud or a first duct 128 with a branched second duct 130 extending from the first duct 128. Moreover, the environmental control system 108 described herein is configured to be located in any location within the vehicle 100 where the orifice plate 124 may be quickly installed and removed as described herein. For example, the environmental control system 108 may be located within the wing structure 104, the fuselage 102, and/or any other location within the vehicle 100.

The first conduit 112 and the second conduit 114 each have a first end 132 and a second end 134. Additionally, the first conduit 112 and the second conduit 114 each include at least one wall 136 that defines a channel 138, a conduit diameter 140, and a conduit center line 142. In this embodiment, the conduit diameter 140 of the first conduit 112 and the conduit diameter 140 of the second conduit 114 are substantially equal. In order to ensure that the flow of air is channeled from the destination 118 to the source 110 without leaking, the conduit center line 142 of the first conduit 112 and the conduit center line 142 of the second conduit 114 are aligned such that the environmental control system 108 is substantially air tight. In the example embodiment, the conduit diameter 140 of the first conduit 112 is about 2.0 inches to about 3.5 inches and the conduit diameter 140 of the second conduit 114 is about 2.0 inches to about 3.5 inches. Specifically, in the illustrated embodiment, the conduit diameter 140 of the first conduit 112 is about 3.0 inches and the conduit diameter 140 of the second conduit 114 is about 3.0 inches. In alternative embodiments, the conduit diameter 140 of the first conduit 112 is about 4.0 inches to about 13.0 inches and the conduit diameter 140 of the second conduit 114 is about 4.0 inches to about 13.0 inches. The diameters provided herein are exemplary of conduits positioned within certain portions of an aircraft and are provided for context only. Accordingly, the diameters provided herein do not represent the only embodiments of the diameters of the first conduit and/or the second conduit.

The sleeve 120 is a foam sleeve made from polyurethane foam. In alternative embodiments, the sleeve 120 is made from any material that enables the connector assembly 116 to operate as an insulator as described herein. Additionally, the sleeve 120 includes at least one wall 144 that defines a sleeve channel 146, a sleeve diameter 148, and a sleeve center line 150. In this embodiment, the sleeve diameter 148 is greater than the conduit diameter 140 such that the sleeve 120 slides over and circumscribes the first conduit 112 and/or the second conduit 114. Additionally, the sleeve center line 150 substantially aligns with the conduit center line 142 of the first conduit 112 and/or the conduit center line 142 of the second conduit 114 when the sleeve 120 circumscribes the first and/or second conduits. In this embodiment, the sleeve diameter 140 is about 2.0 inches to about 4.0 inches. Specifically, in the illustrated embodiment, the sleeve diameter 140 is about 3.0 inches. The diameters provided herein are exemplary of sleeves positioned within certain portions of an aircraft and are provided for context only. Accordingly, the diameters provided herein do not represent the only embodiments of the diameters of the sleeve.

Figure 4:
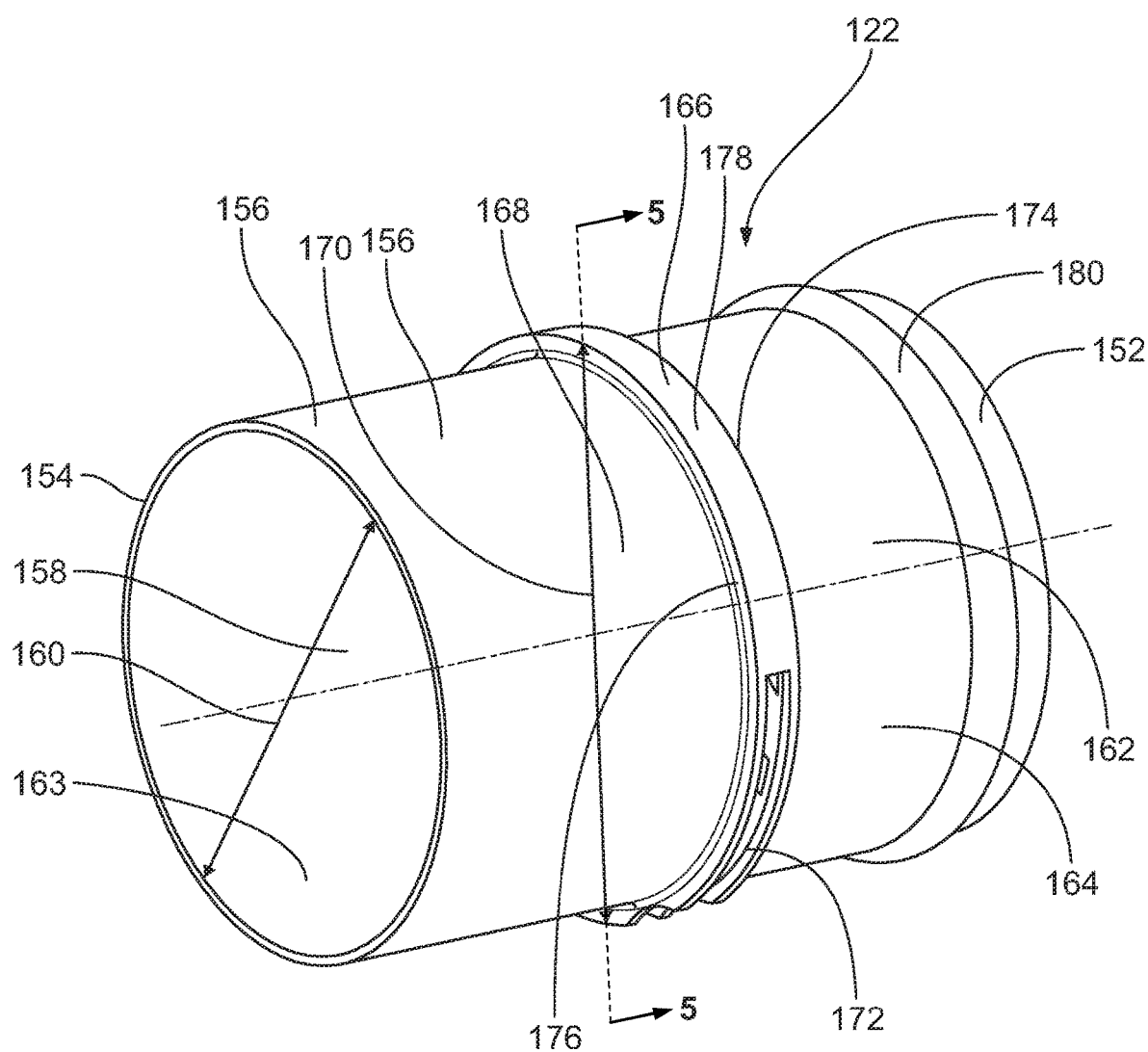
FIG. 4 is a perspective view of an example connector for use in the connector assembly shown in FIG. 2.

FIG. 4 is a perspective view of the connector 122. The connector 122 of this embodiment connects the first conduit 112 to the second conduit 114. In this example, the connector 122 is a cylindrical conduit that channels the fluid from the first conduit 112 to the second conduit 114. In alternative implementations, the connector 122 has any shape that enables the connector assembly 116 and/or the environmental control system 108 to operate as described herein such as, but not limited to, a rectangular shape for ducting. In the illustrated embodiment, the shape of the connector 122 substantially corresponds to the shape of the first conduit 112 and/or the second conduit 114. In alternative embodiments, the shape of the connector 122 may be different than the shape of the first conduit 112 and/or the second conduit 114.

Figure 5:
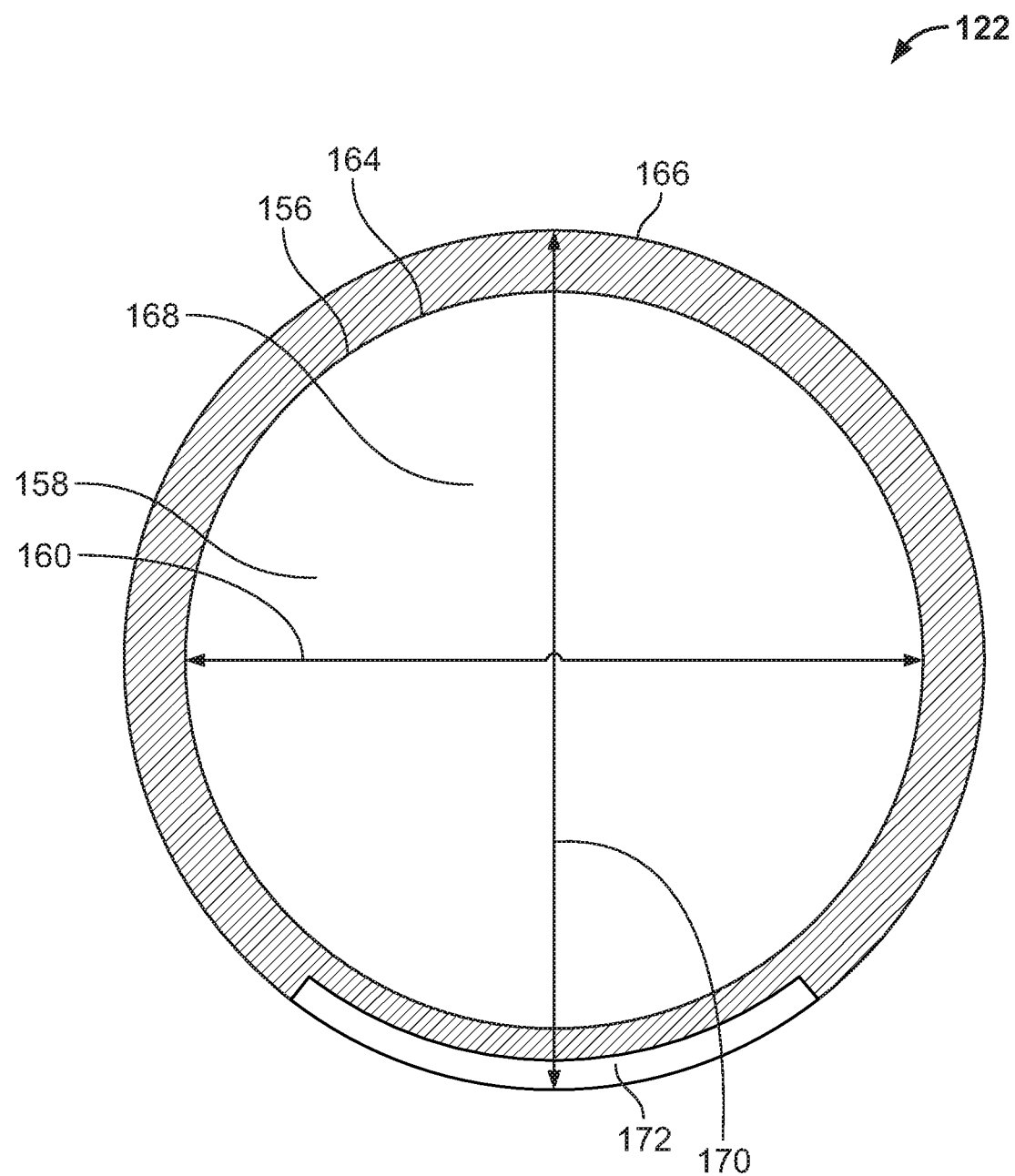
FIG. 5 is a cut-away view of the example connector shown in FIG. 4.
Figure 6:
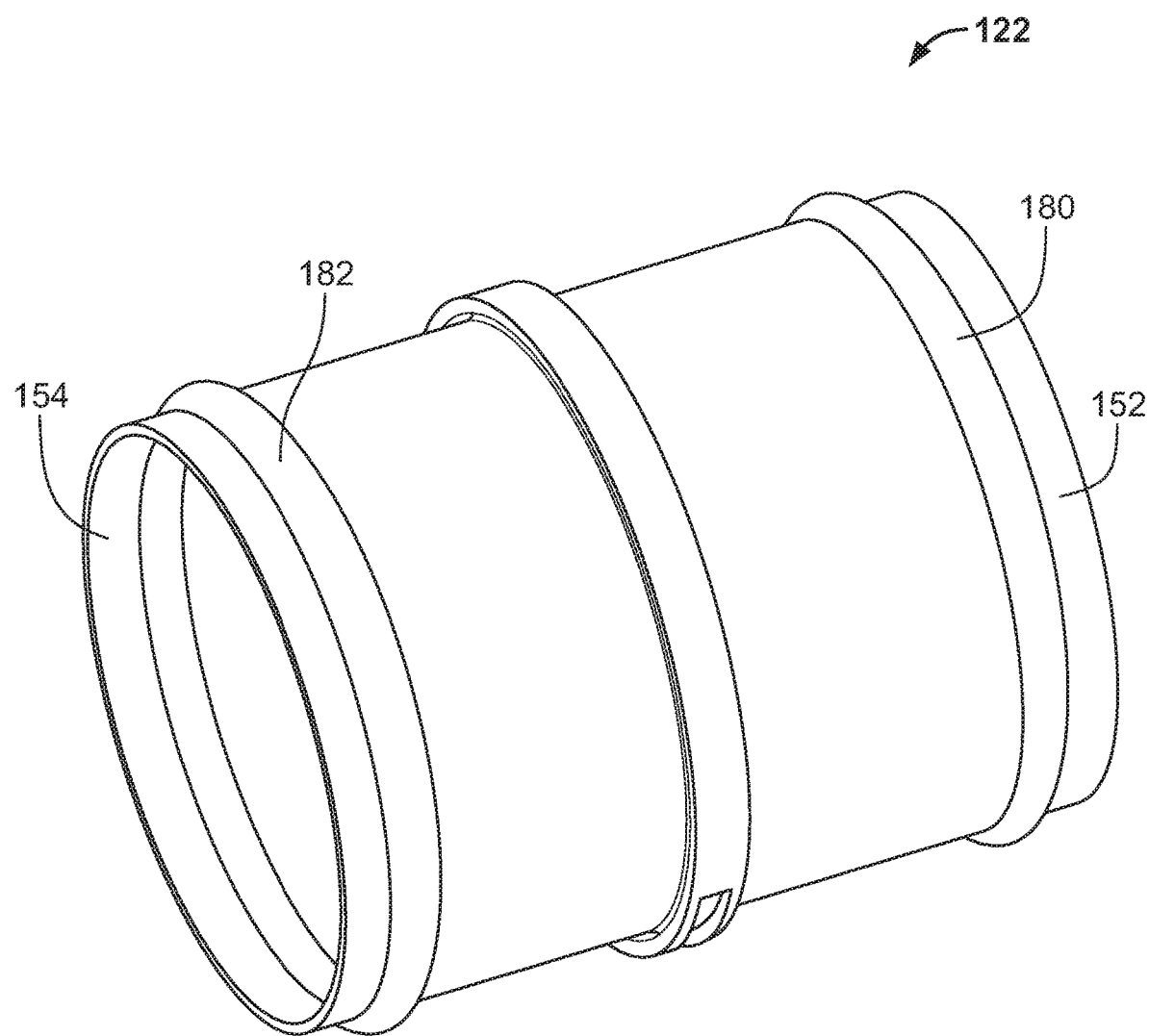
FIG. 6 is a perspective view of another example connector for use in the connector assembly shown in FIG. 2.
Figure 7:
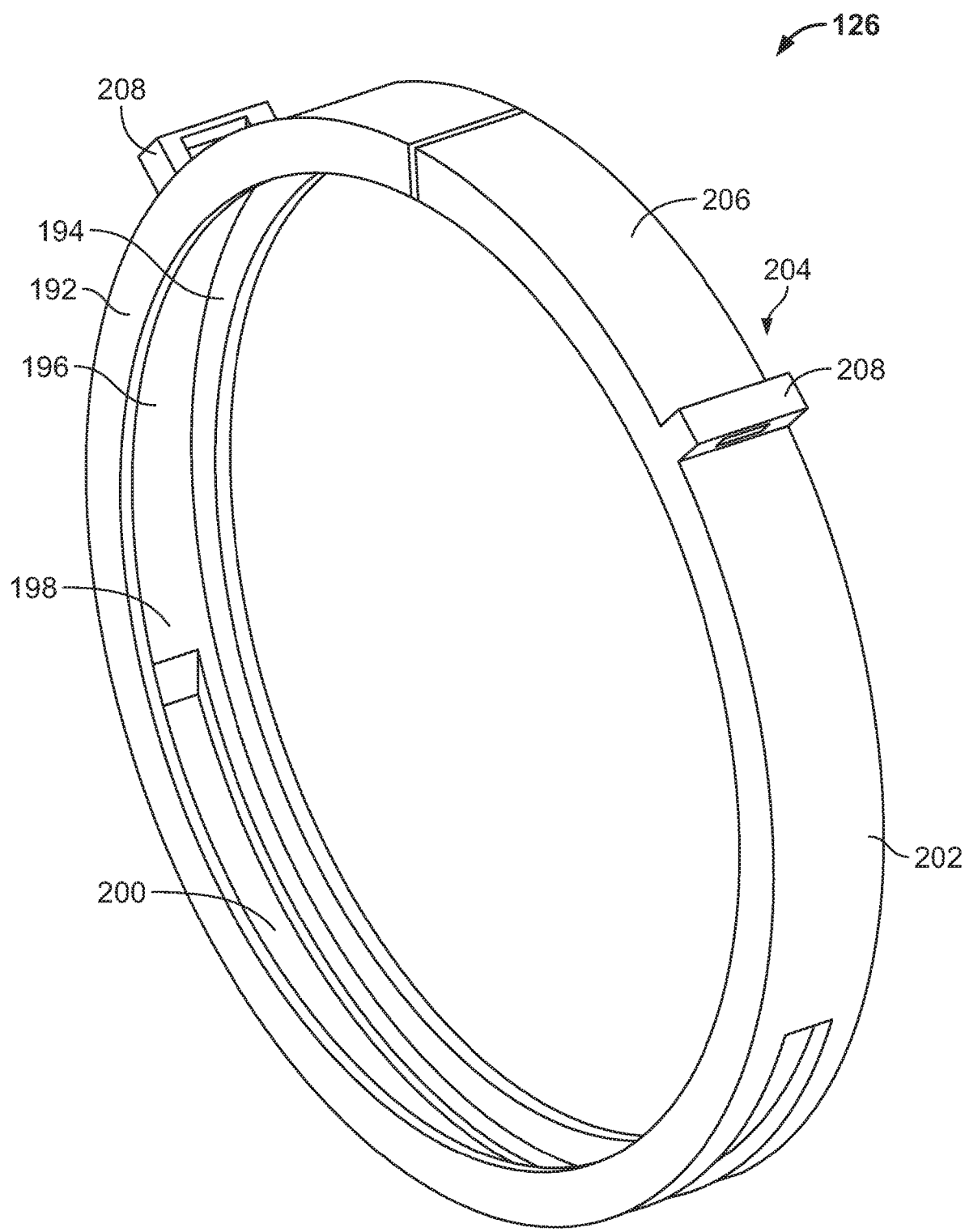
FIG. 7 is a perspective view of an example connector ring for use in the connector assembly shown in FIG. 2.

FIG. 5 is a cut-away view of the connector 122. The connector 122 also has a first end 152 and a second end 154. Additionally, the connector 122 includes at least one wall 156 that defines a connector channel 158, a connector diameter 160, and a connector center line 162. In this embodiment, the connector diameter 160 is substantially equal to the conduit diameter 140 of the first conduit 112 and/or the conduit diameter 140 of the second conduit 114. In order to ensure that the flow of air is channeled from the destination 118 to the source 110 without leaking, the connector center line 162, the conduit center line 142 of the first conduit 112, and the conduit center line 142 of the second conduit 114 are aligned such that the environmental control system 108 is substantially air tight. In the example embodiment, the connector diameter 160 is about 1.9 inches to about 3.9 inches. Specifically, in the illustrated embodiment, the connector diameter 160 is about 2.9 inches. In alternative embodiments, the connector diameter 160 is about 4.0 inches to about 14.0 inches. The diameters provided herein are exemplary of connectors positioned within certain portions of an aircraft and are provided for context only. Accordingly, the diameters provided herein do not represent the only embodiments of the diameters of the connectors.

The wall 156 of the connector 122 includes an inner surface 163 and an outer surface 164. The wall 156 also includes a ridge 166 extending from the outer surface 164, and the ridge 166 defines a receptacle 168 and a receptacle diameter 170 greater than the connector diameter 160. The receptacle 168 receives and retains the orifice plate 124. The ridge 166 also defines a connector slot 172 that receives the orifice plate 124 into the receptacle 168. In the illustrated embodiment, the connector slot 172 includes a first elongated opening defined within the ridge 166. More specifically, in the illustrated embodiment, the ridge 166 includes a first side 174, a second side 176, and a backing 178. The first side 174 and the second side 176 extend perpendicularly from the outer surface 164, and the backing 178 is positioned perpendicularly to the first side and the second side and connects the first side to the second side. The connector slot 172 is defined within the backing 178. The first side 174, the second side 176, and the backing 178 define the receptacle 168.

The connector 122 also includes a first bead 180 defined in at least one of the first end 152 and the second end 154 for attaching the connector 122 to at least one of the first conduit 112 and the second conduit 114. The bead 180 includes a curved ridge extending from the outer surface 164. In alternative embodiments, the bead 180 may have any shape that enables the connector 122 to operate as described herein, including, without limitation, a rectangular shape for attaching the first end 152 of the connector 122 to the first conduit 112. In another alternative embodiment illustrated in FIG. 5, the connector 122 includes the first bead 180 defined in the first end 152 and a second bead 182 defined in the second end 154. The first bead 180 attaches the first end 152 of the connector 122 to the first conduit 112, and the second bead 182 attaches the second end 154 of the connector 122 to the second conduit 114.

The orifice plate 124 of this embodiment restricts the flow of the fluid within the environmental control system 108. The orifice plate 124 has a circular shape corresponding to the shape of the receptacle 168 and defines at least one orifice 184 extend through the orifice plate. In the illustrated embodiment, the orifice plate 124 defines a plurality of orifices 184 extending through the orifice plate. In an alternative embodiment, the orifice plate 124 defines a single orifice 184 extending through the orifice plate. In the illustrated embodiment, the orifices 184 have a circular shape. In alternative embodiments, the orifices 184 may have any shape that enables the orifice plate 124 to operate as described herein, including, without limitation, a rectangular shape for restricting the flow of the fluid within the environmental control system 108. The orifice plate 124 has an orifice plate diameter 186 less than the receptacle diameter 170 and greater than the connector diameter 160. In this example, the orifice plate diameter 186 is about 2.0 inches to about 4.0 inches. Specifically, in the illustrated embodiment, the orifice plate diameter 186 is about 3.0 inches. The diameters provided herein are exemplary of orifice plates positioned within certain portions of an aircraft and are provided for context only. Accordingly, the diameters provided herein do not represent the only embodiments of the diameters of the orifice plates.

The orifice plate 124 has an edge 188 and at least one identification tag 190 attached to the edge of the orifice plate. In the illustrated embodiment, the orifice plate 124 includes a plurality of identification tags 190 attached to the edge 188 of the orifice plate. The identification tag 190 is configured to identify the orifice plate 124. Specifically, the identification tag 190 includes identifying information displayed on the identification tag that allows an operator, an installer, and/or a maintenance person to identify the orifice plate 124. Additionally, the identification tag 190 may be detachable from the orifice plate 124.

The connector ring 126 is attached to the connector 122 and receives and retains the orifice plate 124 within the receptacle 168. Specifically, the connector ring 126 circumscribes the ridge 166 and is actuated about the ridge 166 to receive and retain the orifice plate 124 within the receptacle 168. The connector ring 126 includes a first side 192, a second side 194, and a backing 196. The first side 192 and the second side 194 extend perpendicularly from the backing 196 to define a channel 198 that circumscribes the ridge 166. The connector ring 126 defines a ring slot 200 and a covering portion 202. More specifically, the backing 196 defines the ring slot 200 and the covering portion 202. The ring slot 200 is a second elongated opening defined in the backing 196 that has a size and shape that substantially corresponds to the size and shape of the first elongated opening (the connector slot 172). The covering portion 202 is a portion of backing 196 that is solid and configured to cover the connector slot 172.

The connector ring 126 has an identification tag holder 204 positioned on an outer surface 206 of the backing 196. The identification tag holder 204 is configured to retain the identification tag 190 and/or attach the identification tag 190 to the connector ring 126 such that the identifying information on the identification tag is visible to the operator, the installer, and/or the maintenance person. In the illustrated embodiment, the identification tag holder 204 includes two loops 208 positioned on the outer surface 206 of the backing 196. In alternative embodiments, the identification tag holder 204 includes any device that retains the identification tag 190 as described herein. Additionally, in an alternative embodiment, the connector ring 126 may not include the identification tag holder 204. Rather, the connector assembly 116 may include another device that retains the identification tag 190 as described herein or the operator, the installer, and/or the maintenance person may attach the identification tag 190 to the connector assembly 116 with an adhesive (i.e., glue) or with an adhesive tape such as duct tape.

The environmental control system 108 and the connector assembly 116 channel a flow of air from the source 110 to the destination 118. The environmental control system 108 and the connector assembly 116 are constructed of suitable materials, such as, without limitation, stainless steel, plastic, sheet metal, and/or any other material suitable for channeling air. In the illustrated embodiment, the connector 122 and the connector ring 126 are constructed of injected molded nylon. The connector assemblies 116 described may also be installed in other types of fluid handling systems that channel fluids other than air. As such, the connector assemblies 116 may be constructed of materials suitable for channeling other fluids.

During operation, the connector assembly 116 is configured such that the orifice plate 124 may be easily and quickly removed to reduce replacement/installation time and costs which facilitates efficiency and proper installation. The connector 122 and the connector ring 126 are configured such that the orifice plate may be quickly removed through the connector slot 172 and the ring slot 200. More specifically, to install the orifice plate 124, the connector slot 172 is aligned with the ring slot 200. The orifice plate 124 is inserted into the connector slot 172 and the ring slot 200 such that the orifice plate is positioned within the receptacle 168. The covering portion 202 is aligned with the connector slot 172, retaining the orifice plate 124 within the receptacle 168. To remove the orifice plate 124, the connector slot 172 is aligned with the ring slot 200. The orifice plate 124 is removed from the receptacle 168 by removing the orifice plate through the connector slot 172 and the ring slot 200. In the illustrated embodiment, aligning the connector ring 126 includes rotating the connector ring. In alternative embodiments, aligning the connector ring 126 may include any other action that aligns the connector slot 172 and the ring slot 200 or the connector slot 172 and the covering portion 202. The connector assembly 116 allows for quick removal of the orifice plate 124 in a variety of situations including, without limitation, normal operation of the environmental control system 108, cleaning the environmental control system 108, maintaining the environmental control system 108, retrofitting the environmental control system 108, replacing the orifice plate 124, balancing the environmental control system 108, rebalancing the environmental control system 108, and/or installation of the environmental control system 108.

Additionally, the connector assembly 116 has a built-in orifice plate identification system because the identification tags 190 are not visible to the operator when the orifice plate 124 is positioned within the connector assembly 116. Specifically, the identification tag 190 is attached to the identification tag holder 204 in order to identify the orifice plate 124 when it is installed in the connector assembly 116. During installation of the orifice plate 124, the operator detaches at least one identification tag 190 from the orifice plate and attaches the identification tag to the identification tag holder 204. The operator attaches the identification tag to the identification tag holder 204 by sliding the identification tag 190 into the loops 208. Accordingly, the connector assembly 116 allows for quick installation and removal of the orifice plate 124 while also allowing for identification of the orifice plate after installation.

Figure 8:
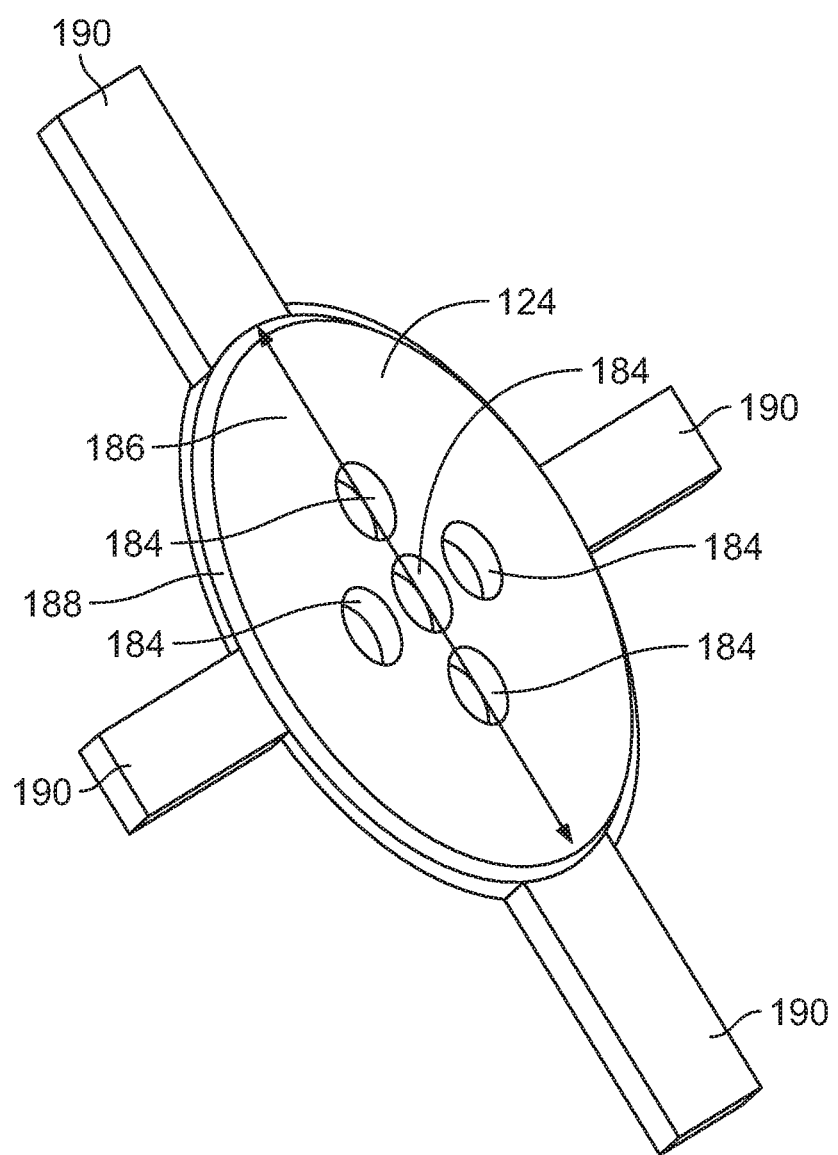
FIG. 8 is a perspective view of an example orifice plate for use in the connector assembly shown in FIG. 2.

During normal operations, the connector assembly 116 controls the flow of the fluid within the environmental control system 108. FIG. 8 is a flow diagram of an example of a method 800 of controlling a flow of a fluid in an environmental control system of an aircraft. Method 800 optionally includes installing 802 a first conduit and a second conduit in the aircraft. Method 800 also includes connecting 804 a connector to the first conduit and the second conduit. The connector includes at least one wall including a ridge defining a receptacle and a connector slot defined within the ridge. Method 800 further includes installing 806 a connector ring on the connector. The connector ring defines a ring slot and a covering portion and is aligned with the connector slot. Method 800 also includes inserting 808 an orifice plate through the ring slot and the connector slot into the receptacle. Method 800 further includes aligning 810 the covering portion with the connector slot to cover the connector slot with the cover portion and retaining the orifice plate within the receptacle. Method 800 also includes channeling 812 the flow of fluid from the first conduit through the connector and the orifice plate into the second conduit. The orifice plate controls a flow rate of the flow of fluid through the connector. Method 800 may also include attaching 814 at least one of the first conduit and the second conduit to a bead where the connector has a first end and a second end and the bead defined in at least one of the first end and the second end.

Figure 9:
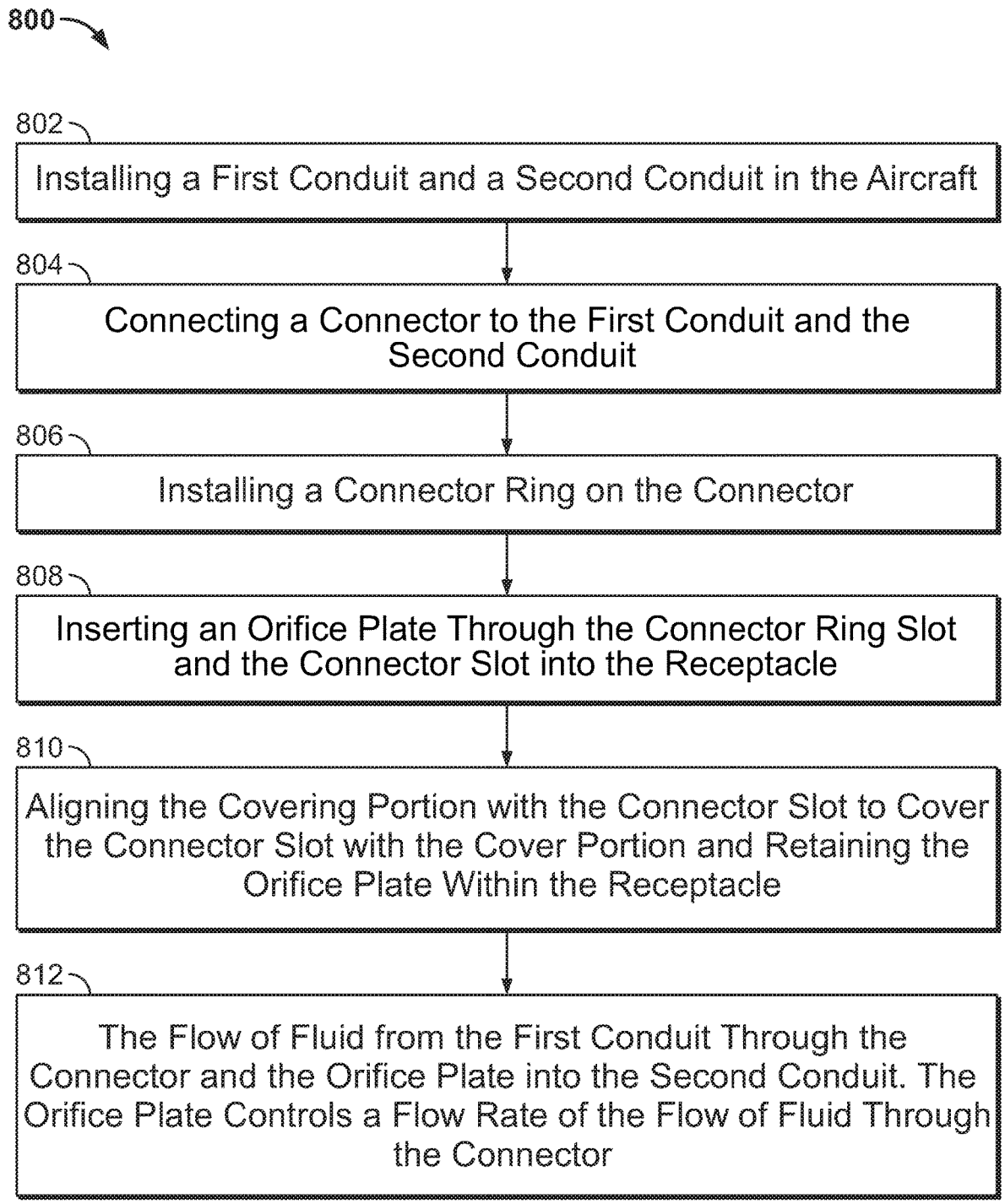
FIG. 9 is a flow diagram of an example of a method of controlling a flow of a fluid in an environmental control system of the vehicle shown in FIG. 1.

The connector assembly 116 may also be used when the environmental control system 108 is not operating normally. For example, the connector assembly 116 may be used during cleaning of the environmental control system 108, maintaining the environmental control system 108, retrofitting the environmental control system 108, replacing the orifice plate 124, balancing the environmental control system 108, rebalancing the environmental control system 108, and/or installation of the environmental control system 108. For example, FIG. 9 is a flow diagram of an example of a method 900 of retrofitting an environmental control system of an aircraft. Method 900 includes inserting 902 the orifice plate through the connector slot and the ring slot into the receptacle. Method 900 also includes aligning 904 the covering portion with the connector slot. Method 900 may further include replacing at least one of the first conduit and the second conduit; actuating the connector ring to align the connector slot with the ring slot; removing a first orifice plate through the connector slot with the ring slot; and/or designing a second orifice plate.

FIG. 10 is a flow diagram of an example of a method 1000 of cleaning an environmental control system of an aircraft. Method 1000 includes aligning 1002 the connector slot with the ring slot. Method 1000 also includes removing 1004 the orifice plate through the connector slot with the ring slot. Method 1000 further includes cleaning 1006 the environmental control system. Method 1000 also includes inserting 1008 the orifice plate through the connector slot and the ring slot into the receptacle. Method 1000 further includes aligning 1010 the covering portion with the connector slot. Method 1000 may further include vacuuming at least one of the first conduit and the second conduit; scrubbing at least one of the first conduit and the second conduit with a brush; and/or rotating the connector ring.

Figure 11:
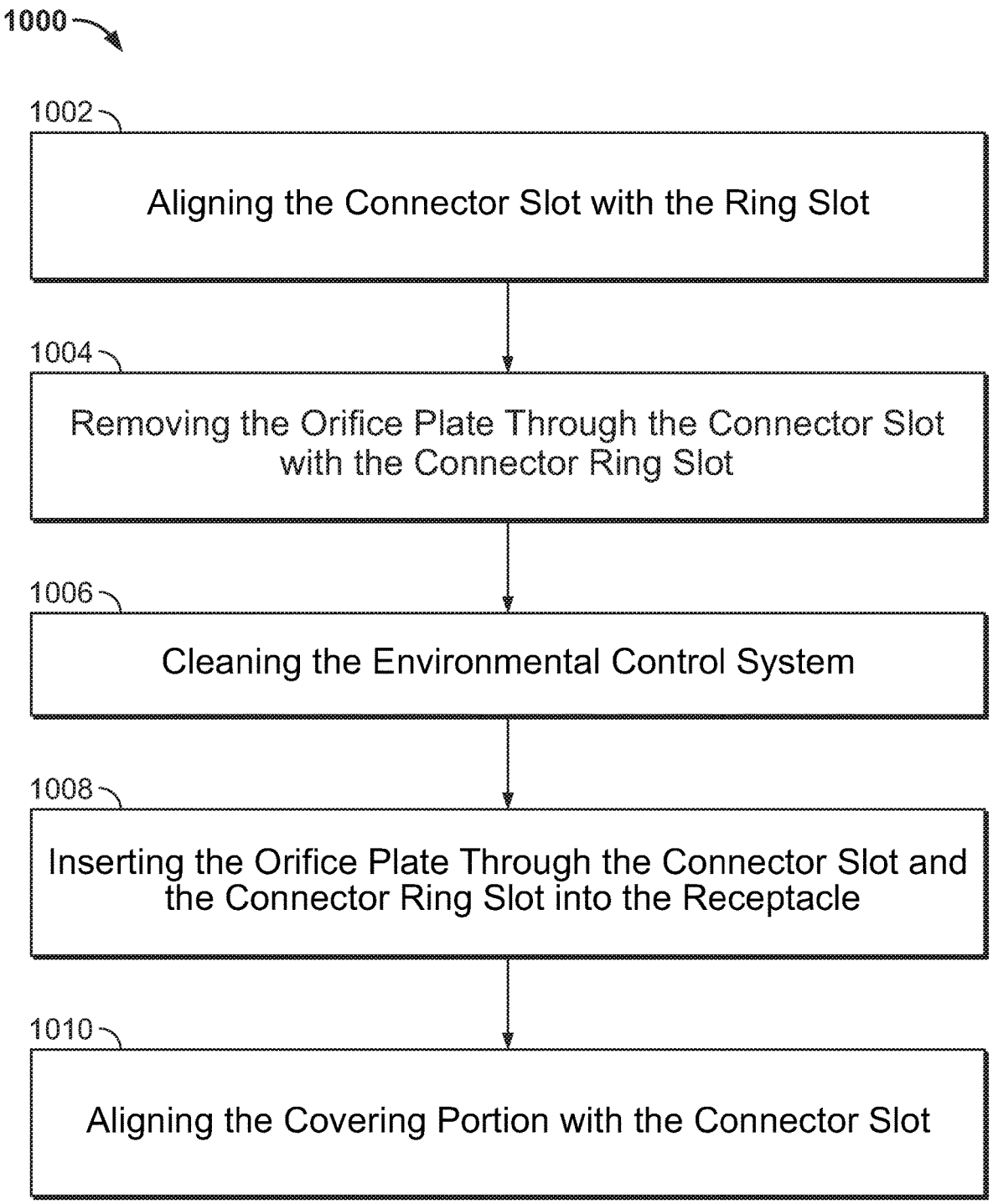
FIG. 11 is a flow diagram of an example of a method of cleaning an environmental control system of the vehicle shown in FIG. 1.

FIG. 11 is a flow diagram of an example of a method 1100 of replacing a first orifice plate in an environmental control system of an aircraft. Method 1100 includes aligning 1102 the connector slot with the ring slot. Method 1100 also includes removing 1104 the first orifice plate through the connector slot with the ring slot. Method 1100 further includes inserting 1106 a second orifice plate through the connector slot and the ring slot into the receptacle. Method 1100 also includes aligning 1108 the covering portion with the connector slot. Method 1100 may further include inspecting the first orifice plate; determining whether the first orifice plate should be replaced; and/or designing the second orifice plate based on a performance of the first orifice plate.

FIG. 12 is a flow diagram of an example of a method 1200 of maintaining an environmental control system of an aircraft. Method 1200 includes aligning 1202 the connector slot with the ring slot. Method 1200 also includes removing 1204 the orifice plate through the connector slot with the ring slot. Method 1200 further includes performing 1206 a maintenance task on the environmental control system. Method 1200 also includes inserting 1208 the orifice plate through the connector slot and the ring slot into the receptacle. Method 1200 further includes aligning 1210 the covering portion with the connector slot. Method 1200 may further include replacing at least one of the first conduit and the second conduit; repairing at least one of the first conduit, the second conduit, and the orifice plate; and/or rotating the connector ring.

Figure 13:
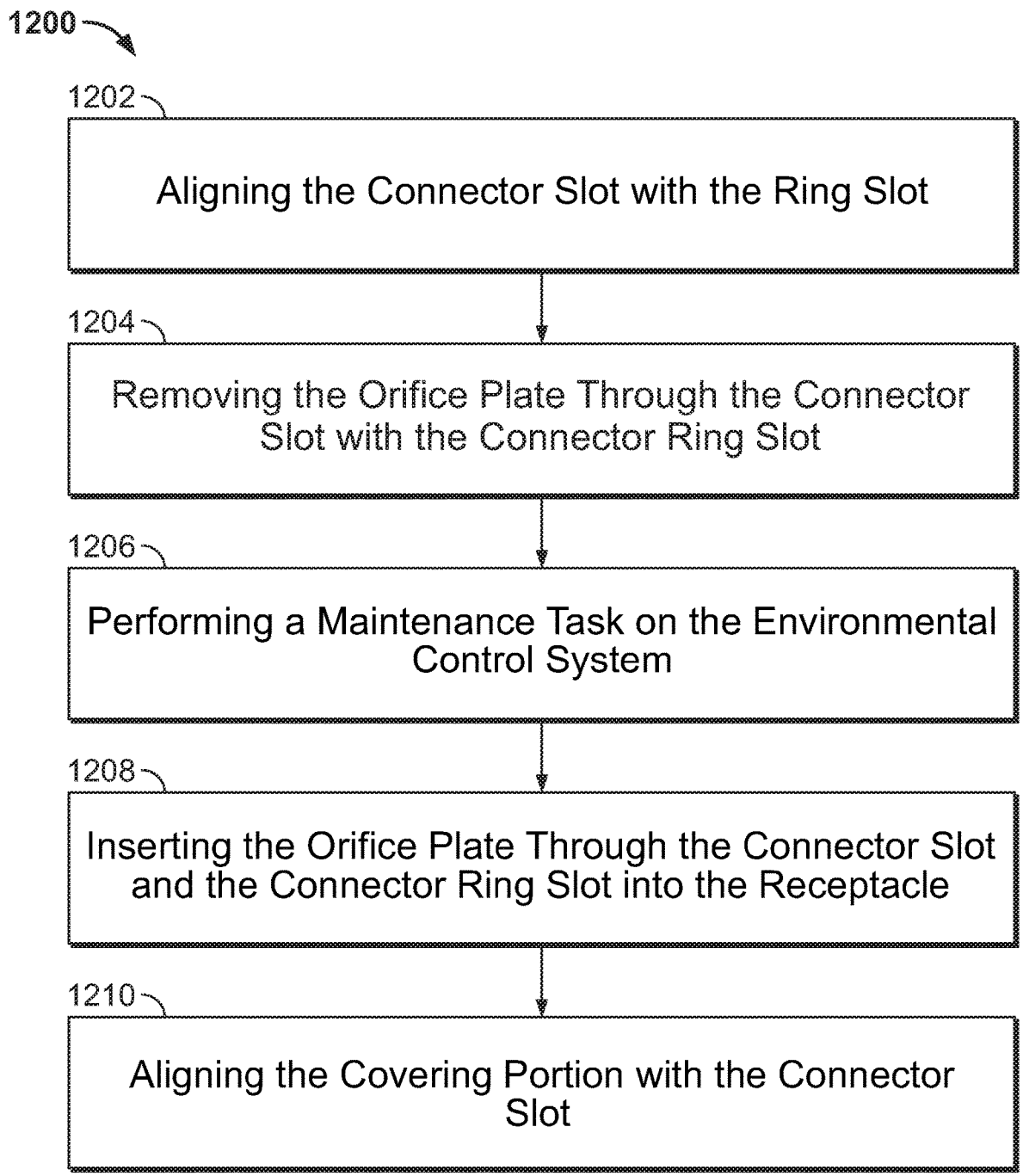
FIG. 13 is a flow diagram of an example of a method of maintaining an environmental control system of the vehicle shown in FIG. 1.
Figure 14:
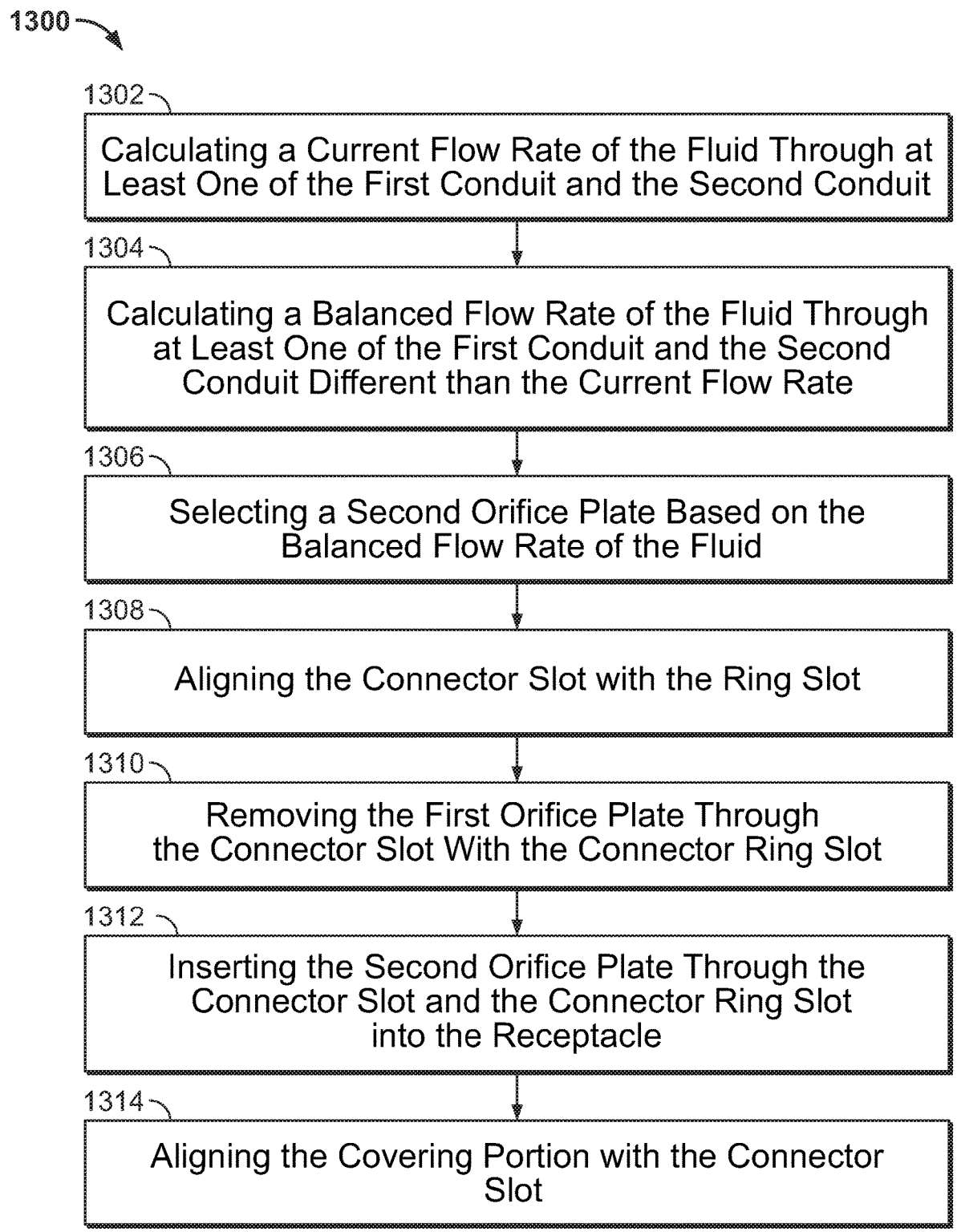
FIG. 14 is a flow diagram of an example of a method of balancing a flow of a fluid in an environmental control system of the vehicle shown in FIG. 1.

FIG. 13 is a flow diagram of an example of a method 1300 of balancing a flow of a fluid in an environmental control system of an aircraft. Method 1300 includes calculating 1302 a current flow rate of the fluid through at least one of the first conduit and the second conduit. Method 1300 also includes calculating 1304 a balanced flow rate of the fluid through at least one of the first conduit and the second conduit different than the current flow rate. Method 1300 further includes selecting 1306 a second orifice plate based on the balanced flow rate of the fluid. Method 1300 also includes actuating 1308 the connector ring to align the connector slot with the ring slot. Method 1300 further includes removing 1310 the first orifice plate through the connector slot with the ring slot. Method 1300 also includes inserting 1312 the second orifice plate through the connector slot and the ring slot into the receptacle. Method 1300 further includes aligning 1314 the covering portion with the connector slot. Method 1300 may further include designing a second orifice plate based on the balanced flow rate of the fluid; determining a size of the orifice; determining how many orifices are defined in the circular plate; and/or determining a shape of the orifice.

The described systems include a connector assembly including a connector, a connector ring, and an orifice plate. The connector is attached to a first conduit and a second conduit of an environmental control system of an aircraft and channels a flow of fluid, typically air, from the first conduit to the second conduit. The environmental control system channels the flow of air from a source, such as a compressor, to a destination such as a lavatory, galley, or other part of the aircraft. The connector assembly enables maintenance personnel to easily and quickly remove, replace, and install the orifice plate within the connector assembly to control the flow of air through the environmental control system. The connector has a connector slot that receives the orifice plate within a receptacle within the connector. When positioned within the receptacle, the orifice plate controls the flow of air through the first conduit, the second conduit, and the environmental control system. The connector ring is attached to the connector and includes a ring slot that substantially corresponds to the connector slot. The ring slot also includes a covering portion that covers the connector slot and retains the orifice plate within the receptacle.

During installation of the orifice plate, the operator actuates the connector ring (i.e., rotates the connector ring about the connector) such that the connector slot and the ring slot are substantially aligned. The orifice plate is inserted through the connector slot and the ring slot into the receptacle. The operator then actuates the connector ring in the opposite direction (i.e., rotates the connector ring about the connector in the opposite direction) such that the connector slot and the covering portion are substantially aligned and the orifice plate is retained within the receptacle. The orifice plate controls the flow of air within the environmental control system.

During removal and/or replacement of the orifice plate, the operator actuates the connector ring (i.e., rotates the connector ring about the connector) such that the connector slot and the ring slot are substantially aligned. The orifice plate is inserted through the connector slot and the ring slot. A second orifice plate is inserted through the connector slot and the ring slot into the receptacle. The operator then actuates the connector ring in the opposite direction (i.e., rotates the connector ring about the connector in the opposite direction) such that the connector slot and the covering portion are substantially aligned and the orifice plate is retained within the receptacle. The orifice plate controls the flow of air within the environmental control system.

The connector assemblies enable maintenance personnel to easily and quickly remove the orifice plate from the environmental control system. As such, the connector assemblies described herein reduce the time, manpower, and cost of installation, replacement, and removal of the orifice plate. Once the orifice plate has been removed, maintenance personnel may clean, maintain, and/or retrofit the environmental control system. Accordingly, the connector assemblies described herein reduce the time, manpower, and cost of cleaning, maintaining, and/or retrofitting the environmental control system.

The systems and methods above are not limited to these specific examples, but rather, components of the systems and/or steps of the methods may be used independently and separately from other components and/or steps described. Although specific features of various examples of the disclosure may be shown in some drawings and not in others, this is for convenience only. In accordance with the principles of the disclosure, any feature of a drawing may be referenced and/or claimed in combination with any feature of any other drawing. As used herein, an element or step recited in the singular and proceeded with the word "a" or "an" should be understood as not excluding plural elements or steps unless such exclusion is explicitly recited. Furthermore, references to "one example" of the present disclosure or "an example" are not intended to be interpreted as excluding the existence of additional examples that also incorporate the recited features.

This written description uses examples to disclose various examples, which include the best mode, to enable any person skilled in the art to practice those examples, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. An environmental control system in an aircraft, the environmental control system comprising:
    a first conduit for channeling air;
    a second conduit for channeling the air; and
    a connector assembly coupled to the first conduit and the second conduit for controlling a flow of air from the first conduit to the second conduit, the connector assembly comprising:
        a connector comprising at least one wall including a ridge defining a receptacle and a connector slot defined within the ridge;
        a connector ring attached to the connector, the connector ring defines a ring slot and a covering portion;
        an orifice plate, wherein the ring slot aligns with the connector slot and the orifice plate is inserted into through the ring slot and the connector slot into the receptacle during installation of the orifice plate, and wherein the covering portion covers the connector slot and retains the orifice plate within the receptacle during operation of the environmental control system; and
        a source of the air and at least one of a lavatory and/or a galley, wherein the first conduit, the second conduit, and the connector assembly channel the air from the source of the air to at least one of the lavatory and the galley.

2. The environmental control system of claim 1, wherein at least one of the first conduit and second conduit comprises a duct.

3. The environmental control system of claim 1, wherein at least one of the first conduit and second conduit comprises a flex hose.

4. The environmental control system of claim 1, wherein the connector has a first end and a second end, the connector comprises a bead defined in at least one of the first end and the second end for attaching the connector to at least one of the first conduit and the second conduit.

5. A connector assembly for an environmental control system for an aircraft, the connector assembly comprising:
    a connector comprising at least one wall including a ridge defining a receptacle and a connector slot defined within the ridge;
    a connector ring attached to the connector, the connector ring defines a ring slot and a covering portion; and
    an orifice plate, wherein the ring slot aligns with the connector slot and the orifice plate is inserted into through the ring slot and the connector slot into the receptacle during installation of the orifice plate, and wherein the covering portion covers the connector slot and retains the orifice within the receptacle during operation of the environmental control system, the orifice plate further comprises at least one identification tag attached to an edge of the orifice plate.

6. The connector assembly of claim 5, wherein the orifice plate has a circular shape and defines at least one orifice extending through the orifice plate.

7. The connector assembly of claim 5, wherein the connector ring comprises at least one identification tag holder configured to retain the identification tag, and wherein the identification tag is detached from the edge of the orifice plate and placed in the identification tag holder during installation of the orifice plate in the receptacle.

8. The connector assembly of claim 6, wherein the connector has a cylindrical shape having a connector diameter, the ridge extends from an outer surface of the connector and defines a receptacle diameter greater than the connector diameter.

9. The connector assembly of claim 8, wherein the orifice plate has an orifice plate diameter less than the receptacle diameter and greater than the connector diameter.

10. The connector assembly of claim 8, wherein the connector slot comprises a first elongated opening defined in the ridge and the ring slot comprises a second elongated opening defined in an outer surface of the connector ring, and wherein the second elongated opening has a size and shape substantially corresponding to the first elongated opening.

11. The connector assembly of claim 8, wherein the connector ring comprises a first side, a second side, and a backing, the first side and the second side extend perpendicularly from the backing to define a channel that circumscribes the ridge.

12. The connector assembly of claim 11, wherein a portion of the backing defines the covering portion and the ring slot extends through the backing.

13. The connector assembly of claim 11, wherein the connector ring further comprises at least one identification tag holder extending from an outer surface of the backing.

14. A method of controlling a flow of a fluid in an environmental control system of an aircraft, the method comprising:
    connecting a connector to a first conduit and a second conduit, the connector including at least one wall including a ridge defining a receptacle and a connector slot defined within the ridge;
    installing a connector ring on the connector, the connector ring defines a ring slot and a covering portion, wherein the ring slot is aligned with the connector slot;
    inserting an orifice plate through the ring slot and the connector slot into the receptacle;
    aligning the covering portion with the connector slot to cover the connector slot with the cover portion and retaining the orifice plate within the receptacle,
    wherein aligning the covering portion with the connector slot comprises rotating the connector ring; and
    channeling the flow of fluid from the first conduit through the connector and the orifice plate into the second conduit, wherein the orifice plate controls a flow rate of the flow of fluid through the connector.

15. The method of claim 14, wherein the orifice plate comprises at least one identification tag attached to an edge of the orifice plate, and wherein the method further comprises detaching the identification tag from the orifice plate.

16. The method of claim 15, wherein the connector ring comprises at least one identification tag holder, and wherein the method further comprises attaching the identification tag to the identification tag holder.

17. The method of claim 15, wherein the connector has a first end and a second end, the connector comprises a bead defined in at least one of the first end and the second end, and wherein the method further comprises attaching at least one of the first conduit and the second conduit to the bead.

18. The connector assembly of claim 1, wherein the connector has a cylindrical shape having a connector diameter, the ridge extends from an outer surface of the connector and defines a receptacle diameter greater than the connector diameter.

19. The connector assembly of claim 1, wherein the orifice plate has an orifice plate diameter less than the receptacle diameter and greater than the connector diameter.

20. The connector assembly of claim 19, wherein the connector slot comprises a first elongated opening defined in the ridge and the ring slot comprises a second elongated opening defined in an outer surface of the connector ring, and wherein the second elongated opening has a size and shape substantially corresponding to the first elongated opening.

* * * * *